United States Patent

[11] 3,594,788

[72] Inventor Martin L. Seelig
Springfield, Mass.
[21] Appl. No. 693,972
[22] Filed Dec. 27, 1967
[45] Patented July 20, 1971
[73] Assignee Combustion Engineering, Inc.
Windsor, Conn.

[54] SENSOR TESTING DEVICE
11 Claims, 2 Drawing Figs.
[52] U.S. Cl. .................................................. 340/410,
340/228
[51] Int. Cl. ................................................. G08b 29/00
[50] Field of Search .......................................... 340/410,
228, 292, 237, 228.1; 250/83.3 UV

[56] References Cited
UNITED STATES PATENTS
2,829,267 4/1958 Howell ........................ 250/83.3
3,143,161 8/1964 Graves et al. ................. 340/410 X
3,158,850 11/1964 Potnanski .................... 340/261 X
3,281,812 10/1966 Guiffrida ...................... 340/214
3,313,933 4/1967 Sibley .......................... 340/214 X
3,409,842 10/1968 Embling et al. ............... 340/214 X 3,447,880 6/1969 Potts et al. ..................... 340/228.1 X Primary Examiner—John W. Caldwell
Assistant Examiner—Perry Palan
Attorney—Fishman and Van Kirk ABSTRACT: Apparatus for sampling the output of a selected condition responsive device or circuit wherein an artificial condition is created and presented to the circuit or device under test. In the disclosed embodiment, the artificial condition is provided by closing a shutter positioned between a sensing element and the environment or condition to which it is normally responsive. Logic circuitry is provided whereby the output of the device or circuit under test will be sampled a predetermined period after the creation of the artificial condition and an alarm will be sounded if a signal indicative of a malfunction is received during the sampling period. After a predetermined additional time lapse, the artificial condition is removed and normal operation is restored with the exceptions that the alarm, if energized, will remain operative until such time as it has been manually reset and the defective device or circuit will be held in a condition where its operation will not effect the functioning of or indications provided by other condition responsive devices.

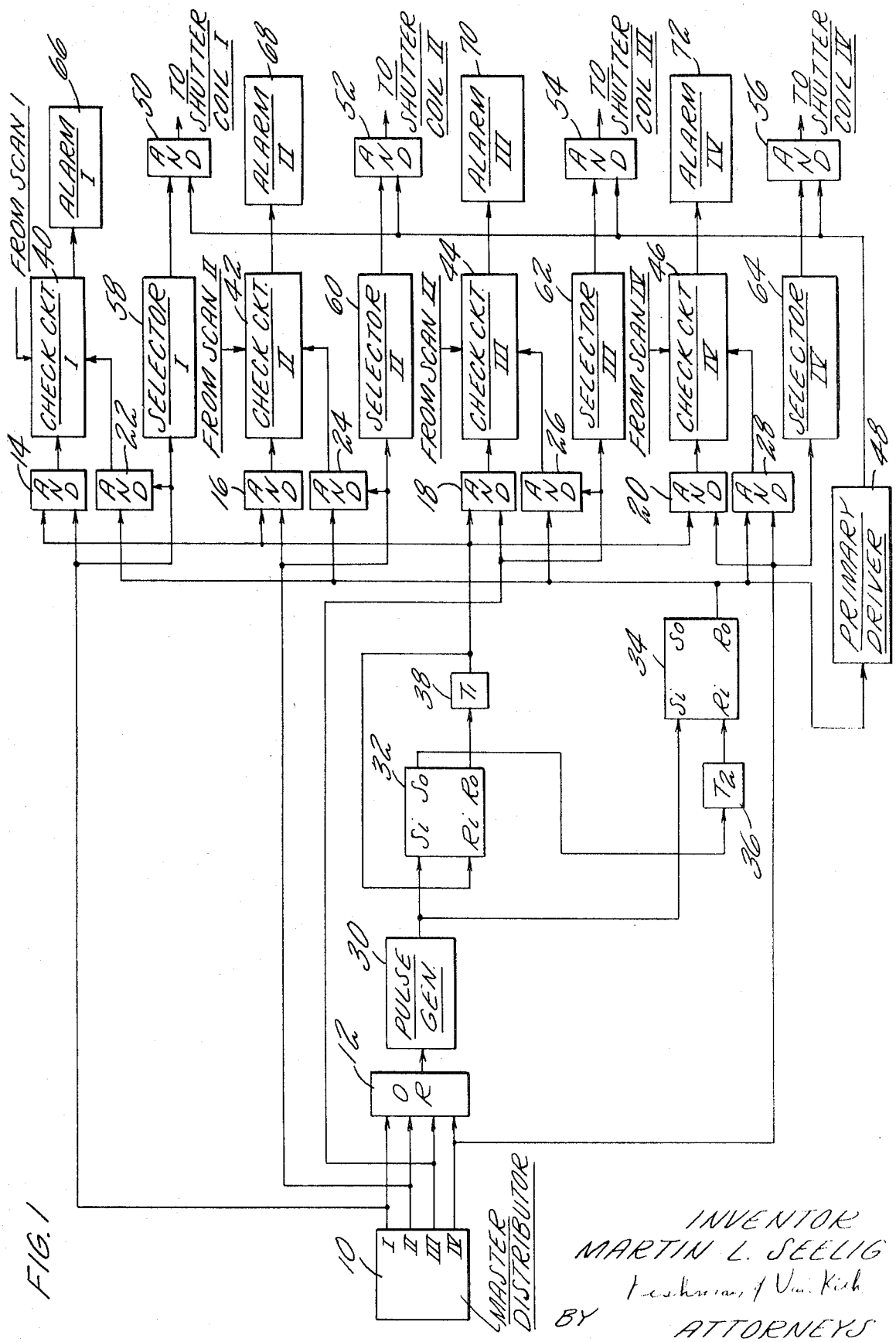

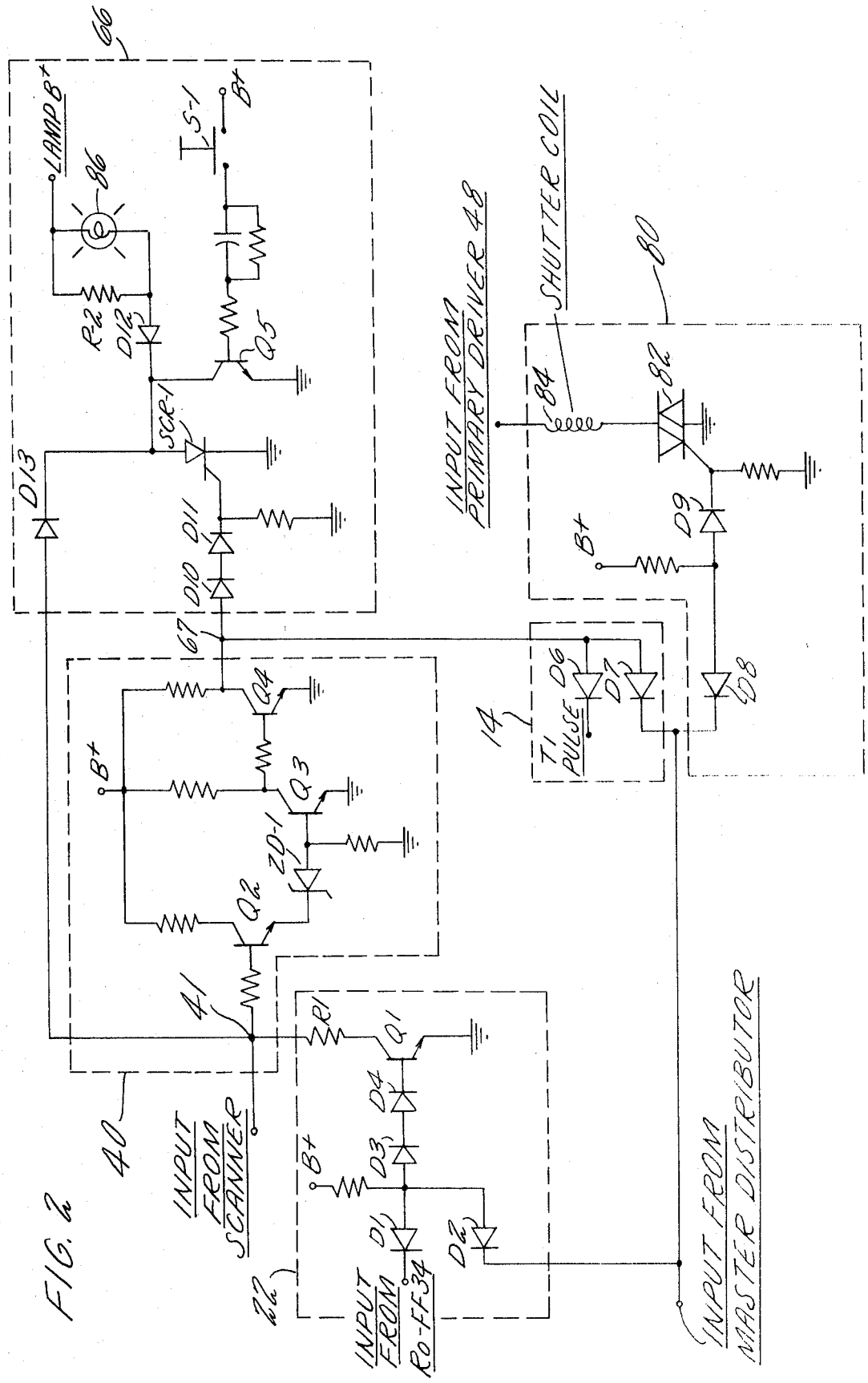

SENSOR TESTING DEVICE

BACKGROUND OF THE INVENTION

The present invention relates to the testing of sensing devices and circuitry associated therewith to determine their operativeness. More particularly, the present invention relates to apparatus for presenting a predetermined environment to a condition sensing device and, during the period that the thus caused environment is maintained, sensing the output of the device or the circuitry associated therewith to compare such output with the normal expected under the thus presented environment.

DESCRIPTION OF THE PRIOR ART

While not limited thereto in its utility, the present invention has been found to be particularly well suited for use with ultraviolet flame detector sensing units of the type which are used in large size boilers and furnaces. For a discussion of flame detectors in general and their manner of use, reference may be had to U.S. Pat. Nos. 3,241,595 and 3,286,093, both issued to L. F. Gilbert and assigned to the same assignee as the present invention.

The condition responsive element in the typical flame detector will be an ultraviolet sensitive pickup or scanner tube of the glow discharge type. The problem in the art has been that such scanner tubes fail in the "danger" mode. That is, the commonly used ultraviolet sensitive pickup device will provide an output commensurate with the presence of flame when it fails in service. Accordingly, there has long been a need to provide a means for readily checking the operativeness of the condition responsive element in flame detectors of the type similar to that shown in the above-referenced Gilbert Pat. No. 3,286,093.

SUMMARY OF THE INVENTION

The present invention provides means for testing the condition of a condition responsive sensor element or pickup device. The present invention may, for example, provide means for sensing the operative state of an ultraviolet scanner tube. In the testing of such an ultraviolet sensitive device, when a particular tube is selected for testing, a signal is generated which causes the closing of an electromechanical shutter positioned between the device and the condition or environment normally seen by the device. The closing of the shutter creates an artificial environment which, in the case of a flame scanner tube, should cause the tube to be extinguished and its associated circuit to provide a signal commensurate with "no flame". A predetermined period after the closing of the shutter (or the establishment of any other preselected test condition for a condition responsive device), the output of the circuitry associated with the device is sampled and, if the device output voltage has not decayed to a sufficiently low output level indicative of the "no flame" condition, an alarm will be energized. The alarm will remain in the energized condition even though, after an additional time period, the shutter is opened. If a defective condition responsive device is discovered during the test, the effect of such device on other pickup elements or circuits will be negated as long as the alarm is energized. Thus, in a predetermined time sequence, a shutter or other device is operated to create an artificial condition for a condition responsive device, after a predetermined period the output of the device or circuit being checked is sampled and after an additional period the artificial condition is removed and normal circuit operation restored if the device or circuit is functioning properly. If, however, during the checking period an output from the condition responsive device circuit should be received which is indicative of a malfunction, an alarm will be energized and the alarm condition will be maintained after normal operating conditions are restored and until such time as the alarm is deliberately reset and the defective device will, in effect, be removed from the overall control system with which it is associated.

BRIEF DESCRIPTION OF THE DRAWING

The present invention may be better understood and its numerous advantages will become apparent to those skilled in the art by reference to the accompanying drawing wherein like reference numerals refer to like elements in the two figures and in which:

FIG. 1 is a block diagram of a preferred embodiment of the present invention.

FIG. 2 is a schematic view of a portion of the preferred embodiment of FIGURE 1.

DESCRIPTION OF THE PREFERRED EMBODIMENT

Referring now to FIG. 1, a preferred embodiment of the present invention is depicted by the block diagram. The embodiment of FIG. 1 is designed for the checking of four separate condition responsive devices or circuits. However, it is to be understood that any number of circuits or devices may have their operability periodically sampled by means of the present invention.

The selection of the circuit or device which is to be checked is controlled by a master distributor 10. Distributor 10 may be comprised merely of a rotary switch which is stepped from position to position by a timing mechanism such as a clock. The closing of a pair of contacts of the switch will connect a source of direct current, not shown, to one of the output terminals of master distributor 10. The direct current potential will be applied to the selected output terminal for a preselected time and thus output pulses having a relatively long pulse width will serially appear at the output terminals of master distributor 10. The period of time between the termination of the pulse on one of the master distributor output terminals and the application of a pulse to the next master distributor output terminal will typically be quite long relative to the length of the output pulses provided by master distributor 10.

The output pulses from master distributor 10 are applied to an OR gate 12 and to a pair of AND gates which are, in the manner to be described below, associated with the means for checking the circuit or condition responsive device selected by the master distributor 10. These AND gates may be referred to as the check circuit AND gates 14, 16, 18 and 20 and the selector AND gates 22, 24, 26 and 28. Thus, when the master distributor indicates, by means of the appearance of a direct current potential on one of its output terminals, that a particular circuit or device is to be tested to determine its operability, a pair of AND gates associated with a checking circuit are armed.

The OR gate 12 applies a signal commensurate with the output signal appearing at any of the terminals of master distributor 10 to a pulse generator 30. Pulse generator 30 may be a monostable multivibrator which, in response to the leading edge of the master distributor output pulse, will generate a single output pulse having a relatively short pulse width. The output pulse from pulse generator 30 is applied to the "set" input terminals of bistable multivibrator or flip-flop circuits 32 and 34. The input pulse to flip-flop 32 results in the appearance, at the set and reset output terminals of this multivibrator, of signals which respectively disable a timing circuit 36 and enable a timing circuit 38.

Timing circuit 36 will typically comprise a free running oscillator which, except when it is disabled by the appearance of a signal of the proper polarity at the set output terminal of flip-flop 32, will provide a series of pulses to the reset input of flip-flop 34. Accordingly, the generation of a pulse by pulse generator 30 will switch flip-flop 34 and this multivibrator will not be reset until after timing circuit 36 has been released by the resetting of flip-flop 32. The switching of flip-flop 34 by an output pulse from pulse generator 30 results in the appearance of a signal at the reset output terminal of this multivibrator which is of the same polarity as the signal appearing at the selected output terminal of master distributor 10. The reset output terminal of flip-flop 34 is connected to the second or other input terminals of selector AND gates 22, 24, 26 and 28. Thus, the selector AND gate which has previously had a signal applied thereto from master distributor 10 will be "opened" and will provide a signal or voltage level to an associated one of checking circuits 40, 42, 44 and 46. The function of the signal provided by the selector AND gate and the operation of the check circuits will be described in detail below.

The reset output terminal of the flip-flop 34 is also connected to a primary driver 48 which may be comprised merely of an amplifier. The output of primary driver 48 is applied to shutter AND gates 50, 52, 54 and 56. Shutter AND gates 50, 52, 54 and 56 are, in the case where the devices to be tested comprise ultraviolet sensitive flame scanner tubes, associated with an electromagnetic shutter actuating mechanism of the type shown in a copending application entitled "Flame Scanner with Electrical Shutter," Ser. No. filed by Lyman F. Gilbert, and assigned to the same assignee as the present invention. The other input to AND gates 50, 52, 54 and 56 will be the master distributor output signals as passed by selector circuits 58, 60, 62 and 64.

The output terminals of master distributor 10 are each connected to the input terminal of a respective one of selector circuits 58, 60, 62 and 64. When an output signal appears at one of the master distributor output terminals, this signal will be applied to a selector circuit which is associated with the device or circuit to be tested. The master distributor output signal will be passed by the selector circuit to the second input terminal of its associated shutter AND gate. Accordingly, the appearance of an output signal at one of the master distributor output terminals will result in the energization and closing of a shutter in front of the selected device, the current for energization of the shutter coil being provided by primary driver 48 through the shutter AND gate associated with the selected shutter coil, the AND gate having been armed by the master distributor output signal as passed by one of the selector circuits. The shutter will remain closed for a period determined in the manner to be described below, shutter opening being commensurate with the resetting of flip-flop 34.

As previously discussed, ultraviolet sensitive pickup devices usually fail in the "danger" mode. That is, when an ultraviolet light responsive scanner tube associated with a flame detector fails in service, the device becomes self-exciting and provides an output signal commensurate with the presence of flame. The state or operativeness of the pickup device can thus be checked by sensing the output signal provided thereby during such time as the device cannot see the flame. Accordingly, it is necessary to energize the appropriate one of check circuits 40, 42, 44 and 46 during the period that the shutter positioned adjacent the condition responsive device associated with such check circuit is closed. However, since the circuitry associated with the condition responsive device itself will typically employ an SCR which charges a capacitor and a Zener diode connected in parallel with the capacitor to provide a constant output voltage, checking may not be instituted until such time as the capacitor voltage has decayed sufficiently to give an indication as to whether or not the condition responsive device is, in the case of an ultraviolet scanner tube, continuing to fire. Restated, the initiation of the sampling of the output of an ultraviolet scanner tube circuit must be delayed for a sufficiently long period after the shutter has been operated to allow the normally constant circuit output voltage to decay to a low level, such voltage decay not occurring if the scanner tube is defective and continuing to fire. The delay in initiation of checking is controlled by timer 38. Timer 38 will typically be a unijunction timer which, after a delay on the order of 3 seconds, will provide a single output pulse which is applied to the check AND gates 14, 16, 18 and 20 and also back to the reset terminal of flip-flop 32. The application of the timer 38 output pulse to the check AND gate which has been armed by a signal appearing at the selected output terminal of master distributor 10 results in that particular AND gate providing an input signal or voltage level of preselected duration to the associated one of check circuits 40, 42, 44 and 46. Also applied to the check circuits is the output signal from the circuit or device to be checked, for example the output signal from an ultraviolet scanner tube circuit. Thus, each of the check circuits will have three input signals of the same polarity applied thereto. As will be discussed below in connection with the description of FIG. 2, if the level of all of the three input signals to a check circuit is high, the appropriate one of alarms 66, 68, 70 or 72 will be energized. If, however, the level of the input signal to the check circuit from the scanner tube circuit is low, indicative that the scanner tube has stopped firing due to the closing of its associative shutter, the alarm will not be energized.

As previously noted, the single output pulse provided by timer 38, which pulse is generated at a time T1 after the closing of one of the scanner tube shutters, is also applied to the reset input terminal of flip-flop 32. This input signal causes the flip-flop 32 to be reset and the enabling signal will thus be removed from the input of timer 38 and timer 36 will be turned back on. After a period T2 which is longer than the duration of the output pulse provided by timer 38, timer 36 will begin providing output pulses and the first of such output pulses, when applied to the reset input of flip-flop 34, will cause the resetting of this flip-flop. Resetting of flip-flop 34 will remove the second input signal from the "open" selector AND gate and will also remove the input from the primary driver 48. Accordingly, the shutter which has been closed will be opened at this time. Since checking of the operative condition of the scanner tube associated with that shutter has taken place during the period of the output pulse from timer 38, opening of the shutter at this time is desired.

As will also be discussed below in connection with the description of FIG. 2, the alarm circuits 66, 68, 70 and 72 are so constituted that, once energized, they become self latching and an indication of a condition responsive device or circuit failure will persist even though the inputs to the associated check circuit from the check and selector AND gates will respectively have been removed through the termination of the output pulse from timer 38 and the resetting of flip-flop 34. Also, through latching of the alarm, the output of the defective device or circuit will be clamped to ground. The defective device will, therefore, no longer effect the operation of or indications provided by other devices in a control system.

To summarize, before describing FIG. 2, the circuit of FIG. 1 provides means for causing a particular desired input to be presented to a condition responsive device which is to be checked and, after a predetermined time period sufficient to allow stabilization of the device being tested, the output of the device or its associated circuitry is sampled. If the sampled output is other than that which should be generated for the input condition which has been caused, a malfunction indication will be provided. Thereafter, after an additional time lapse, normal operating conditions will be restored by removal of the artificial or test input condition and a second circuit or device may be checked in the same manner. If the checking circuit indicates a malfunction and energizes the alarm, the alarm will remain energized, even though normal operating conditions are restored, until such time as the alarm circuit has been reset and the defective device will effectively be removed from the system or disabled.

Referring now to FIG. 2, the check, selector and alarm circuits of one of the channels of the preferred embodiment of FIG. 1 are shown schematically. Thus, considering the upper or I channel, check AND gate 14, selector AND gate 22, check circuit 40 and alarm circuit 66 are shown. In addition, indicated generally at 80, the selector circuit 58 and shutter AND gate 50 are also shown.

The selector AND gate 22 is a state of the art diode AND gate which is comprised of input diodes $D_1$ and $D_2$ which may respectively be reverse biased by the output levels of flip-flop 34 and the master distributor 10. The turning off of diodes $D_1$ and $D_2$ causes the turning on of series connected diodes $D_3$ and $D_4$ and, in turn, the turning on of transistor $Q_1$. Transistor $Q_1$, when conductive, provides a discharge path to ground for the output of the circuit or device being checked. Thus, during the time that an output signal appears at the reset output terminal of flip-flop 34, transistor $Q_1$ will be gated on and a signal commensurate with the output of the circuit or device being checked will be developed across resistor $R_1$.

Check circuit 40 comprises transistors $Q_2$, $Q_3$ and $Q_4$ and Zener diode $ZD_1$. These elements cooperate to form a level detector of a type known in the art. In operation, the level detector output transistor $Q_4$ will be either gated "on" or "off" depending on the level of the voltage appearing at the input terminal 41 of the check circuit. In one reduction to practice, circuit parameters were chosen so that transistor $Q_4$ would be turned off when the input from the circuit or device being checked was sufficient to develop a signal across resistor $R_1$ in excess in 10 volts. Thus, if transistor $Q_4$ is nonconductive at a time after the closing of the shutter associated with the device being tested which should be sufficiently long to permit the device output voltage to decay to a low level (below 10 volts, for example), the "off" state of transistor $Q_4$ will be an indication of a malfunction of the device being checked.

The check AND gates, such as gate 14, are of a type known in the art and employ a pair of normally forward biased diodes $D_6$ and $D_7$. Diode $D_6$ is biased "off" by the level of the "check" pulse provided by timing circuit 38 at the predetermined time after shutter closing when it is desired to actually sample the output of the condition responsive device or scanner tube circuit under test. Diode $D_7$ is reverse biased by the master distributor output voltage level. Accordingly, when timing circuit 38 provides a "check" output pulse, AND gate 14 will in turn provide an output signal. The output signal from AND gate 14 will appear as an increased voltage level at the input terminal 67 of alarm circuit 66 and at the collector electrode of level detector output transistor $Q_4$. This increased voltage level, if not clamped to ground by conduction of transistor $Q_4$, will cause activation of the alarm in the manner to be described below.

The alarm circuit comprises, in part, series connected diodes $D_{10}$ and $D_{11}$ which are forward biased by the unclamped check signal. Accordingly, if level detector output transistor $Q_4$ is nonconductive and thus indicative of a high level or "malfunction" output from the device under test, the check AND gate output voltage level will be applied to the gate of a silicon controlled rectifier SCR-1. The check AND gate output voltage level is sufficient to fire the SCR. When SCR-1 is turned on, latching current will be provided by a source of direct current, not shown, via malfunction warning lamp 86 and diode $D_{12}$. Thus, once turned on, SCR-1 is self-latching and will remain in the conductive state until extinguished in the manner to be described below. A resistor $R_2$ connected in parallel with lamp 86 is provided so that the SCR will receive latching current in the event that the lamp should fail.

It should also be noted that the output signal from the device or circuit being tested is coupled, via diode $D_{13}$, to the cathode of SCR-1. Accordingly, when the SCR is rendered conductive, the output of the test device or circuit will be clamped to ground via $D_{13}$ and SCR-1. The output of the test device or circuit will thereby be without effect on other elements in a system. For example, a flame detector unit may typically employ four ultraviolet sensitive tubes. The outputs from the circuits associated with the four tubes are added and a summation signal equal to the normal outputs of two conductive tubes will be taken as an indication of flame. If a defective tube is discovered and the output of its circuit clamped to ground, the detector unit will still be operative but the defective device will have no effect on the summation function.

To summarize, once a malfunction has been sensed, a visual alarm commensurate with the defective device will be provided and the alarm will remain energized until deliberately shut off in the manner to be described below. Thus, through the action of master distributor 10, the condition of a plurality of condition responsive devices may be periodically sensed and if any one device should be inoperative, an alarm associated therewith will be energized and maintained in the energized condition. An operator need only periodically check an alarm board to ascertain the status of each of a plurality of condition responsive devices.

The means for unlatching SCR-1 comprises a spring loaded manually operable switch $S_1$ and a pulse generator comprising transistor $Q_5$ and an RC network in its base circuit. The closing of switch $S_1$ will generate a pulse which will bias transistor $Q_5$ into the conductive state thereby momentarily clamping the cathode of SCR-1 to ground and extinguishing the SCR. The extinguishing of SCR-1 will, of course, also extinguish lamp 86. Thereupon, a further check of the condition responsive device corresponding to the warning lamp 86 may be instituted to ascertain if the malfunction warning will again be received.

Referring to the circuitry depicted by reference numeral 80, the selector circuit 58 (FIG. 1) may comprise merely a forward biased diode $D_8$. Selector diode $D_8$ is reverse biased by the master distributor output signal and thereby provides an increased voltage level to shutter AND gate 50 (FIG. 1). Shutter AND gate 50 comprises an additional diode $D_9$ and Triac 82 (a bidirectional SCR). Triac 82 is connected between one end of the shutter coil 84 and ground. The other end of shutter coil 84 receives the output of primary driver 48. The gating on of the shutter AND gate by the master distributor output signal and the output of primary driver 48 will complete a circuit through the shutter coil and current will flow through coil 84 closing the shutter. The shutter will be reopened by the extinguishing of Triac 82 which occurs when the primary driver 48 output is removed upon resetting of flip-flop 34.

While a preferred embodiment has been shown and described, various modifications and substitutions may be made without departing from the spirit and scope of this invention. Accordingly, it is to be understood that this invention has been described by way of illustration rather than limitation.

What I claim is:

1. Apparatus for testing an array of condition responsive devices comprising:

means for sequentially exposing the devices to be tested to a preselected condition;

means for sampling the output of each device a predetermined time after exposure to the preselected condition and for providing signals commensurate with sampled device output;

indication providing means connected to said sampling means and responsive to said signals commensurate with device output for providing signals indicative of inoperative devices;

means for causing termination of the exposure of each device to the preselected condition a predetermined period after the output of the exposed device has been sampled; and means coupled to each of the devices and responsive to the signals provided by said indication providing means for disabling the output of individual of said devices when its associated sampling means provides an output signal commensurate with an operative device.

2. The apparatus of claim 1 wherein said means for exposing the devices to a condition comprises:

shutter means for shielding the devices from the condition to which they are normally exposed when testing is desired.

3. The apparatus of claim 1 wherein said indication providing means comprises:

self-latching alarm means associated with each of said devices and responsive to a signal from said sampling means which is commensurate with a defective device whereby said alarm means will remain energized after termination of a defective exposure of the device to the preselected condition.

4. The apparatus of claim 1 wherein said sampling means comprises:
means coupled to each of said devices and responsive to the energization of said condition exposing means for providing an output signal commensurate with the output of the device which is exposed to the preselected condition;
level detector means connected to each of said means responsive to energization of said exposing means for generating a signal commensurate with the level of the output of the associated device;
means for generating checking signals a predetermined period after exposure of the associated device to the predetermined condition; and
means responsive to said checking signals and said signals commensurate with the level of the device outputs for generating energizing signals for said indication providing means.

5. The apparatus of claim 1 wherein said means for exposing the devices to a preselected condition comprises:
shutter means for selectively shielding the individual devices from the condition to which it is normally exposed;
means for generating shutter means energization command signals; and
means responsive to shutter energization command signals for energizing said shutter means.

6. The apparatus of claim 5 wherein said sampling means comprises:
means coupled to each of the devices and to said shutter command signal generating means for providing output signals commensurate with the output of each device during the period the device is exposed to the predetermined condition;
level detector means connected to each of said means for providing an output signal commensurate with device output, the output of each of said level detector means being at either a high or low level depending on the level of the signal commensurate with the output of the associated device;
means connected to said shutter command signal generating means and responsive to a shutter energization command for generating checking signals a predetermined period after generation of said command signals; and
means connected to each of said level detector means and to said checking signal generating means and responsive to said checking signals and to the level of the output of the associated level detector means for generating an energizing signal for the indication providing means when the level of a level detector means output signal is high indicative of a defective device.

7. The apparatus of claim 6 wherein each of said indication providing means comprises:
self-latching alarm means connected to one of said energizing signal generating means and responsive to an checking signal.

8. The apparatus of claim 6 wherein said means for generating shutter energization command signals comprises:
means for generating a first signal indicative that a device is to be checked;
pulse generator means connected to said first signal generating means and providing an output pulse in response to said first signal;
first bistable circuit means connected to said pulse generator means and being set by the output pulses provided thereby;
second bistable circuit means connected to said pulse generator means and being set by the output pulses provided thereby;
means connecting a first output terminal of said first bistable circuit to said means for providing an output signal commensurate with device output;
means connecting said first output terminal of said first bistable circuit to said shutter energizing means;
means connecting a first output terminal of said second bistable circuit to said checking signal generating means;
means connecting the second output terminal of said second bistable circuit to said means for causing exposure termination; and
means connecting the output of said checking signal generating means to the reset input of said second bistable circuit.

9. The apparatus of claim 8 wherein said means for causing termination of the exposure of the devices to the predetermined conditions comprises:
means connected to said second output of said second bistable circuit for generating a shutter deenergization signal a predetermined time after generation of a checking signal causes resetting of said second bistable circuit; and
means coupling said shutter deenergization signal to the reset input of said first bistable circuit whereby said first circuit is reset and a shutter energization command signal is removed from said first output terminal of said first bistable circuit.

10. The apparatus of claim 9 wherein each of said indication providing means comprises:
self-latching alarm means connected to said energizing signal generating means and responsive to said checking signal.

11. The apparatus of claim 10 further comprising:
means coupled to each of the devices and responsive to the energization of said alarm means for disabling a device output when the alarm means associated with that device is energized.

UNITED STATES PATENT OFFICE
CERTIFICATE OF CORRECTION

Patent No. 3,594,788                    Dated July 20, 1971

Inventor(s) Martin L. Seelig

It is certified that error appears in the above-identified patent and that said Letters Patent are hereby corrected as shown below:

IN THE CLAIMS:

Claim 1, line 21 (column 6, line 64), change "operative" to --inoperative--

Claim 3, line 7 (column 7, line 1), change "a defective exposure of the" to --exposure of the defective--

Signed and sealed this 9th day of May 1972.

(SEAL)
Attest:

EDWARD M. FLETCHER, JR.                 ROBERT GOTTSCHALK
Attesting Officer                       Commissioner of Patents